July 2, 1929.  H. A. KOESTER ET AL  1,719,184
MULTIPLAYING GRAPHOPHONE
Filed Dec. 22, 1924  9 Sheets-Sheet 1
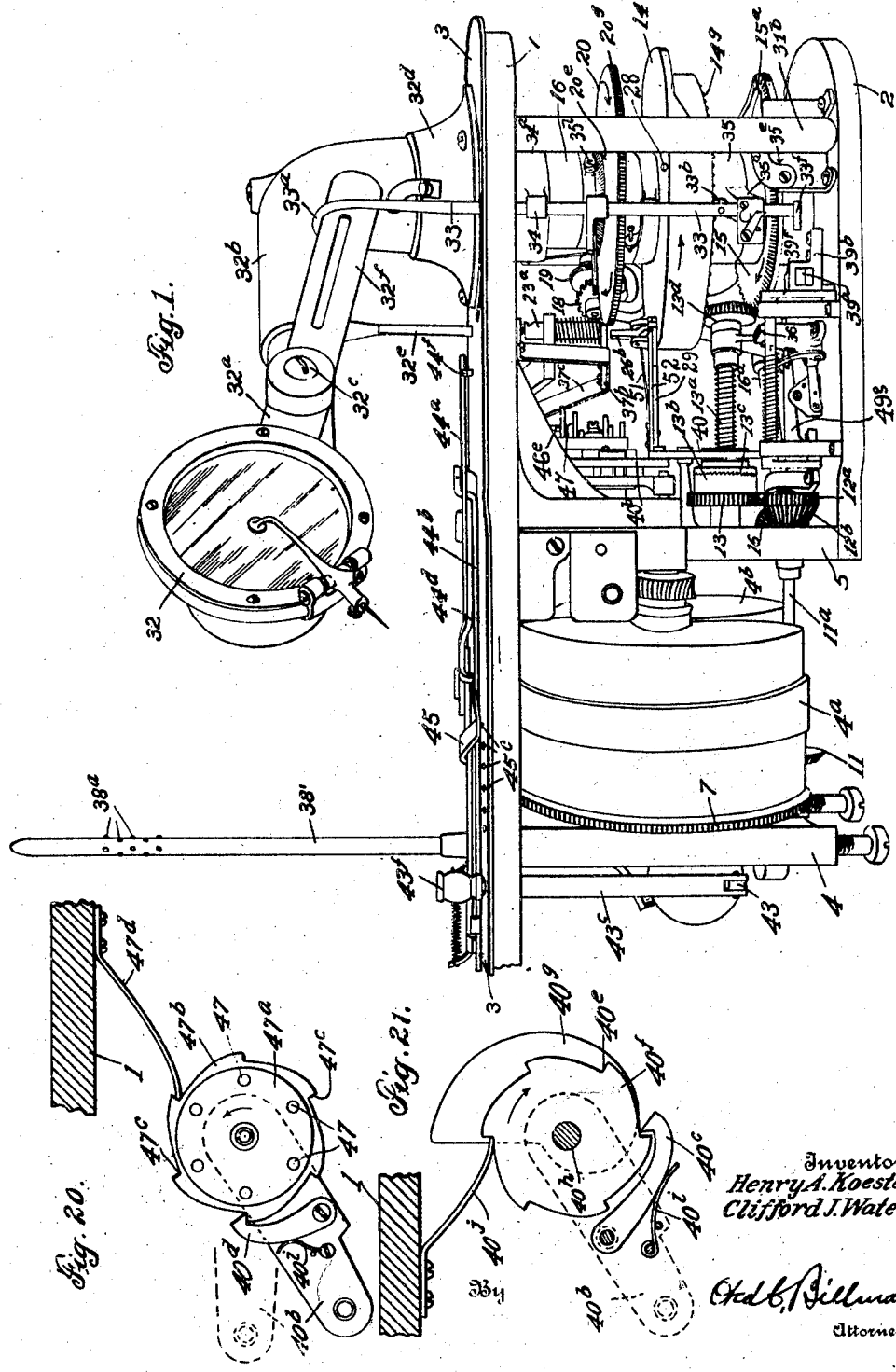

July 2, 1929. H. A. KOESTER ET AL 1,719,184
MULTIPLAYING GRAPHOPHONE
Filed Dec. 22, 1924 9 Sheets-Sheet 2
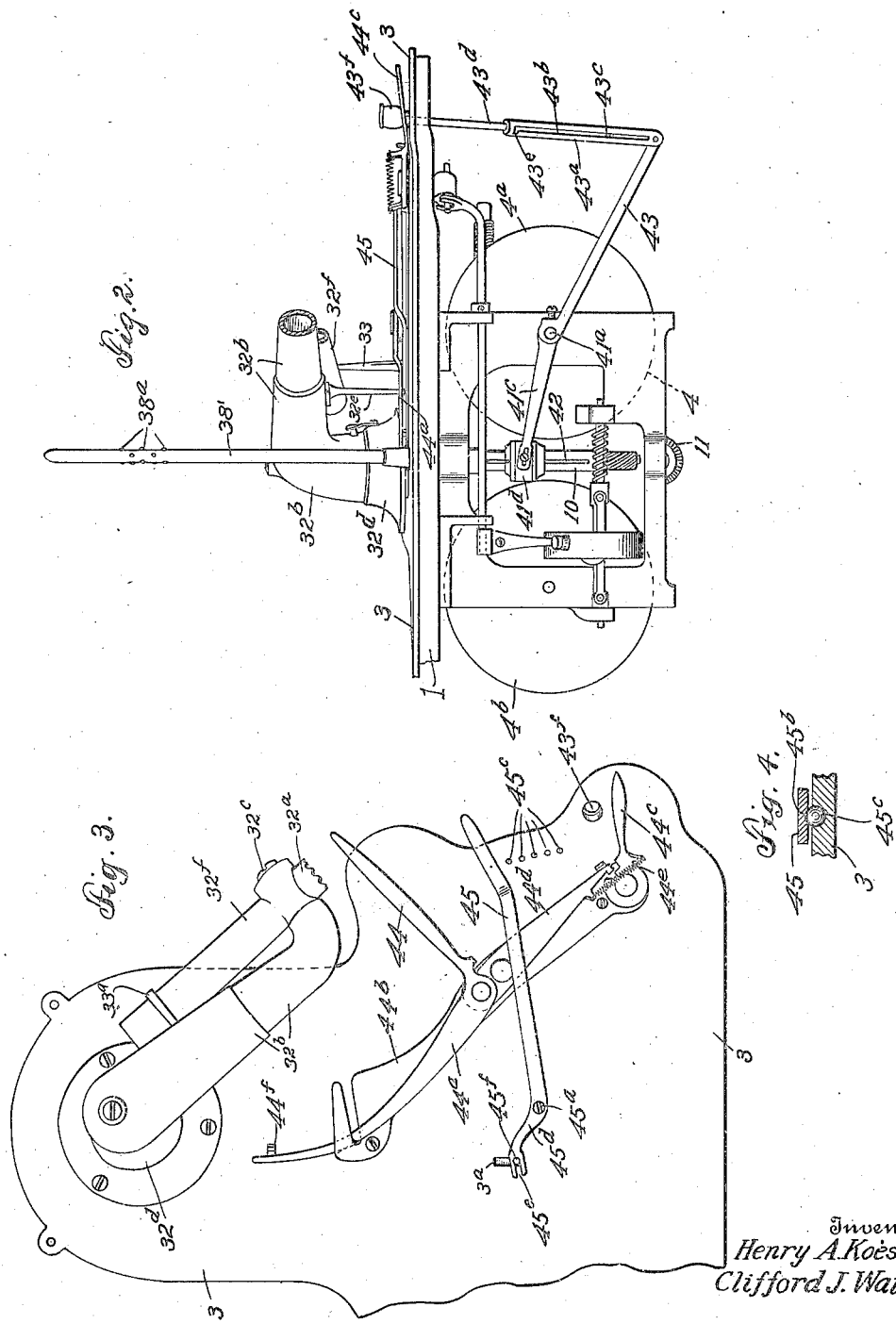
Inventors
Henry A. Koester
Clifford J. Waters
By
Fred C. Billman Attorney

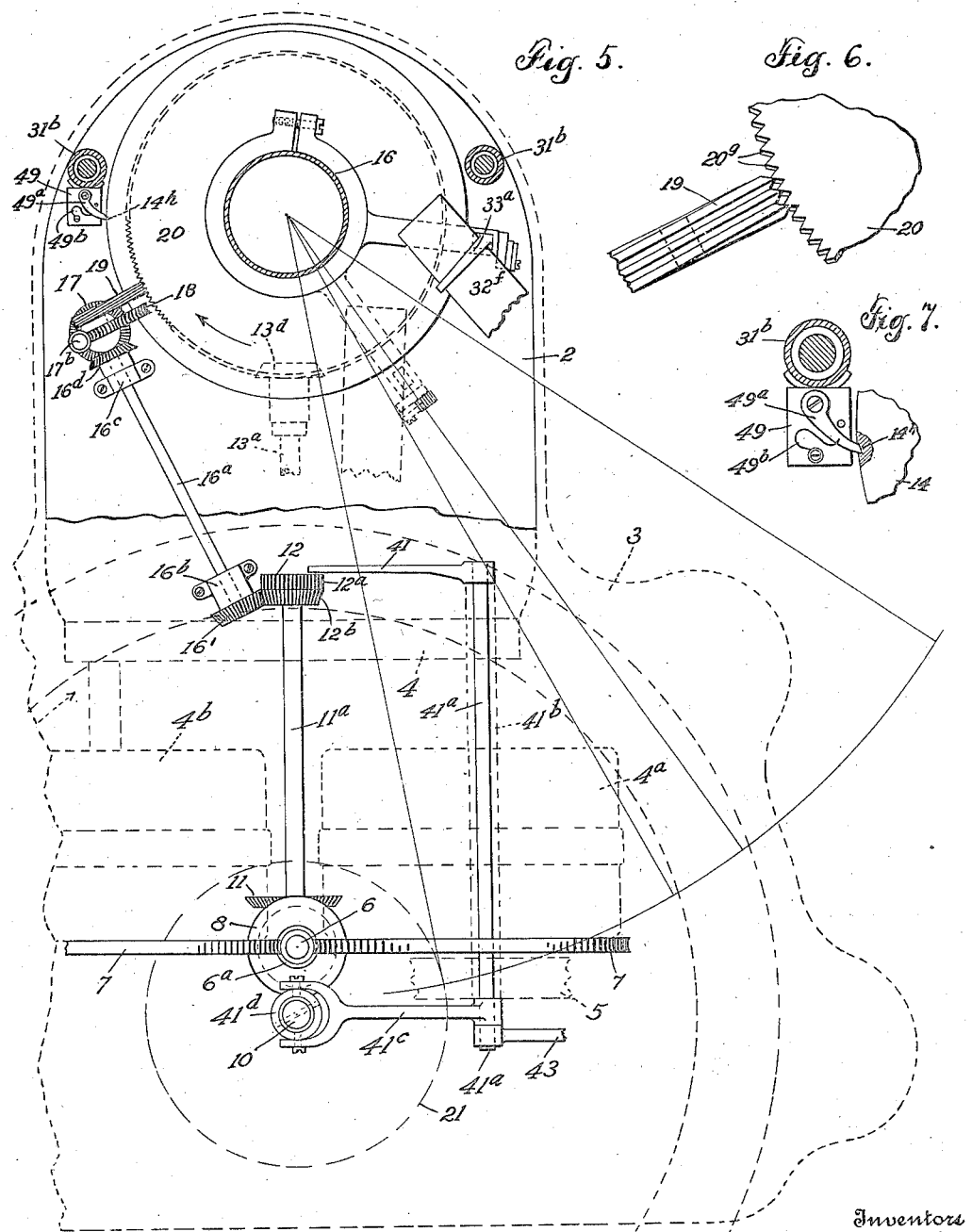

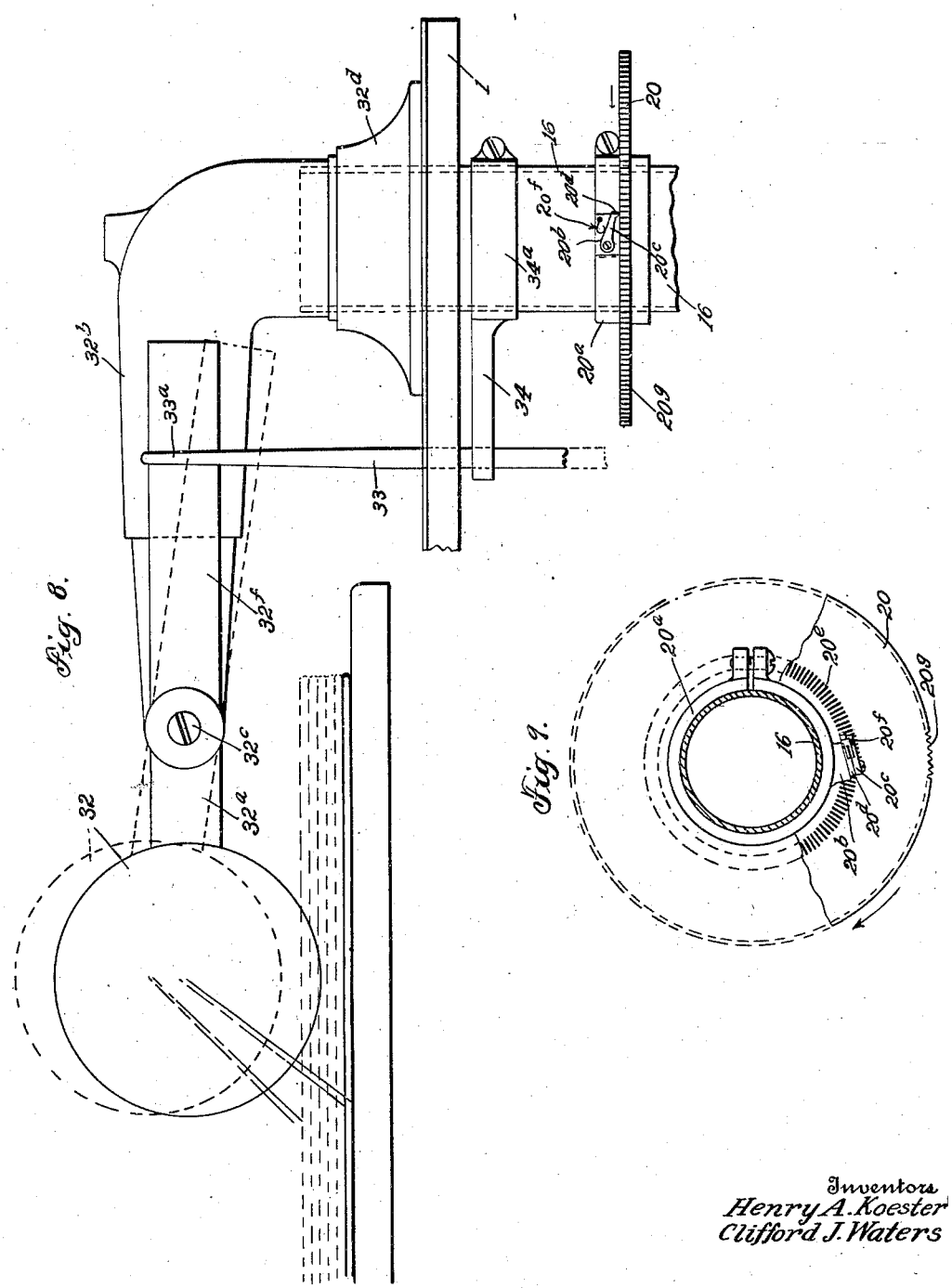

July 2, 1929.　　H. A. KOESTER ET AL　　1,719,184
MULTIPLAYING GRAPHOPHONE
Filed Dec. 22, 1924　　9 Sheets-Sheet 5
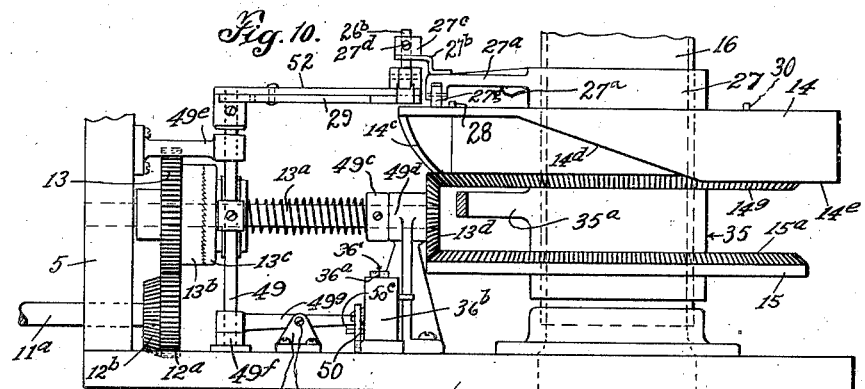
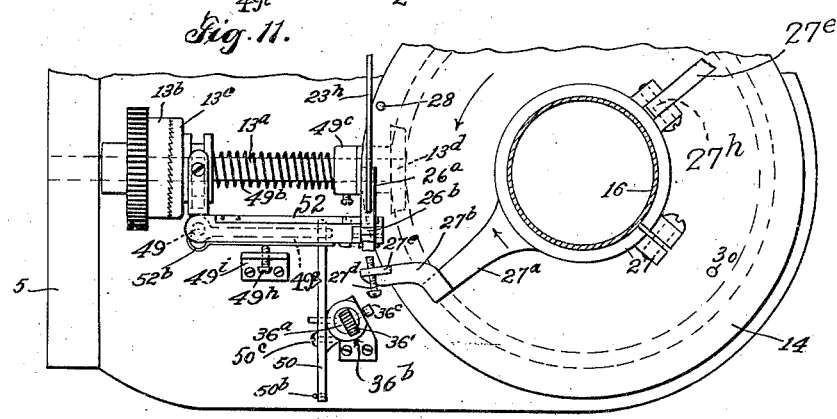
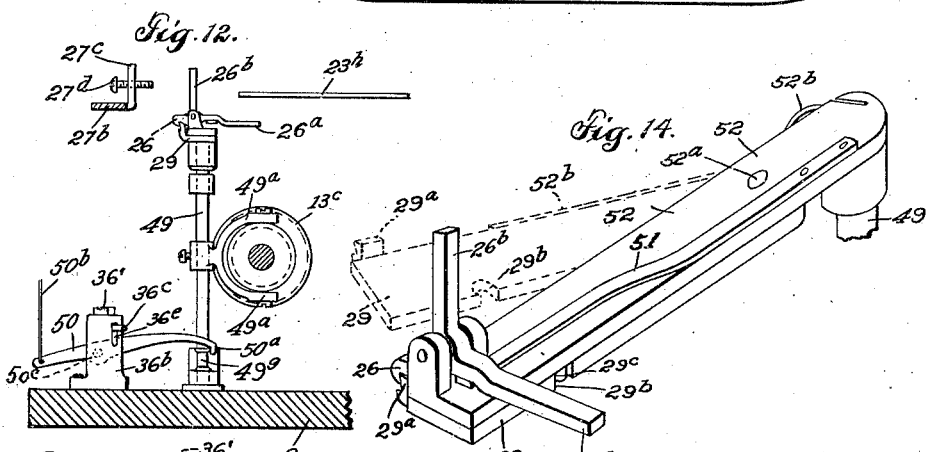
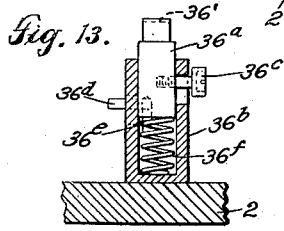
Inventors
Henry A. Koester
Clifford J. Waters
By
Attorney

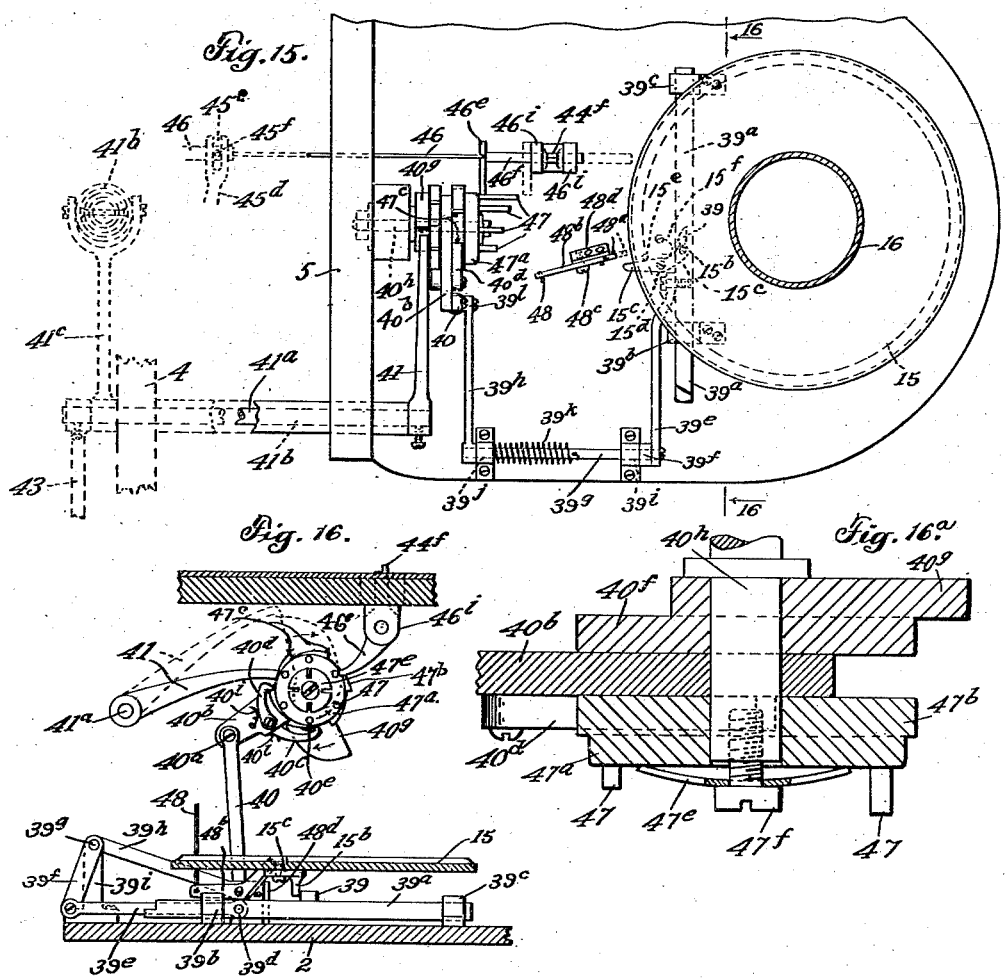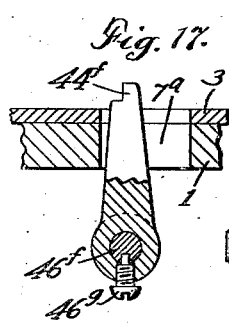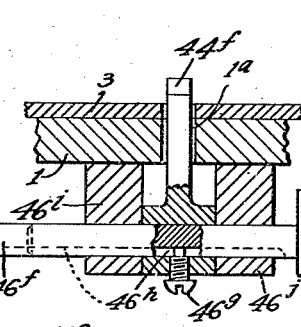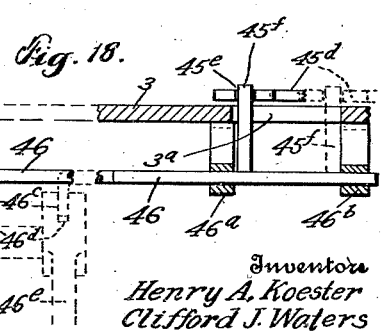

July 2, 1929.  H. A. KOESTER ET AL  1,719,184
MULTIPLAYING GRAPHOPHONE
Filed Dec. 22, 1924   9 Sheets-Sheet 7
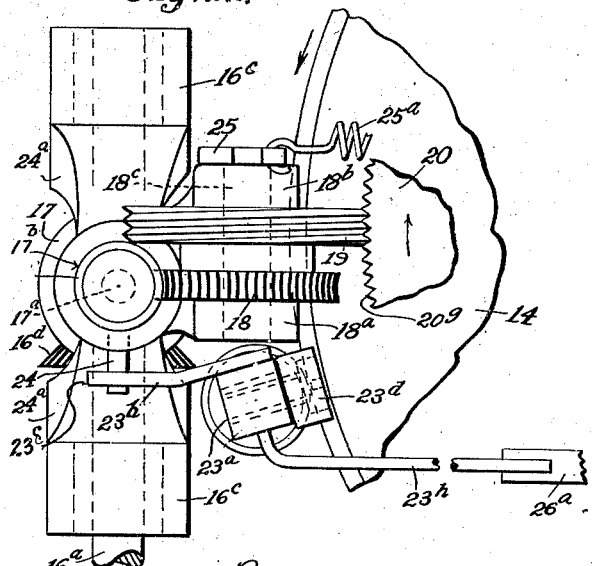
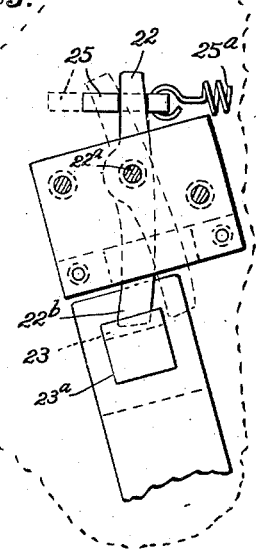
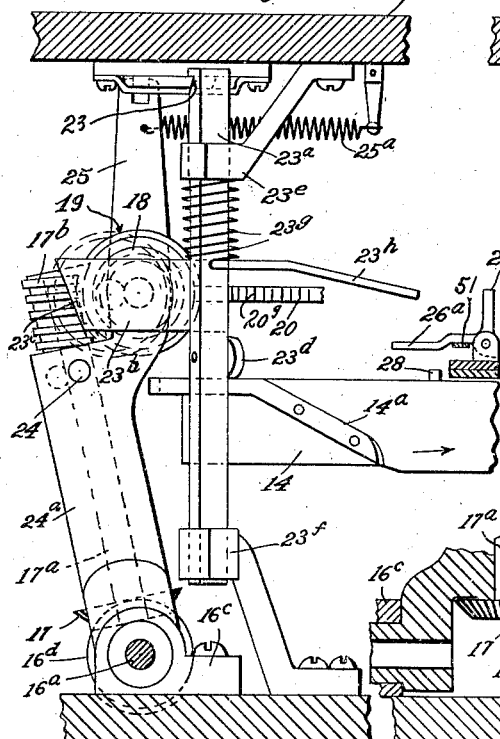
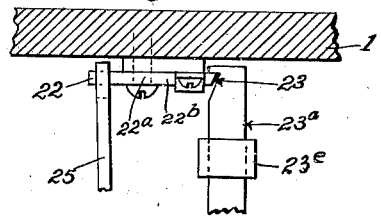
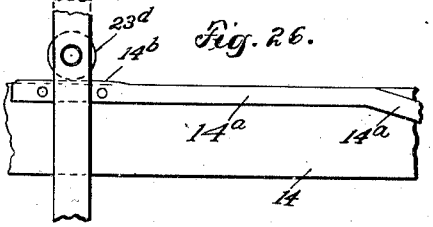
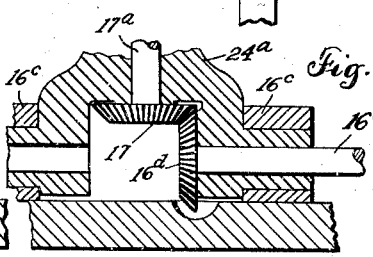
Inventors
Henry A. Koester
Clifford J. Waters
By
Attorney

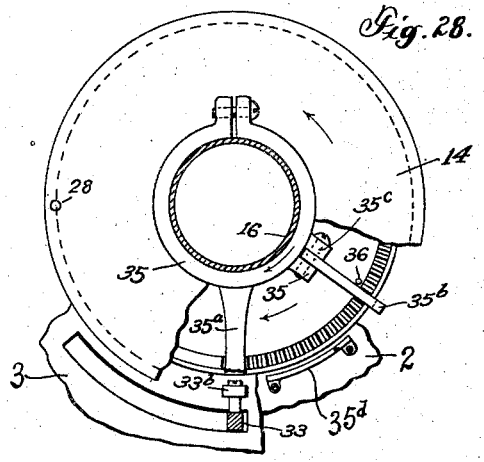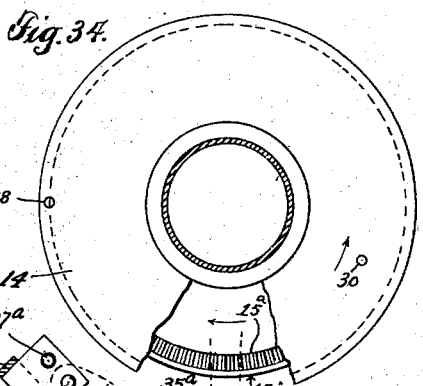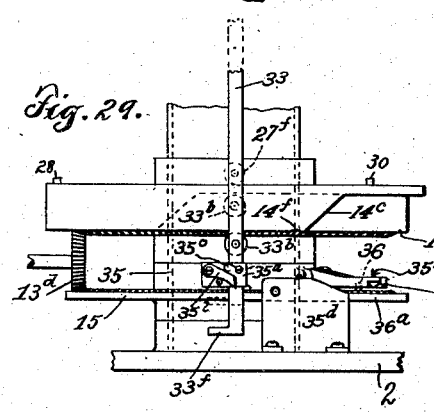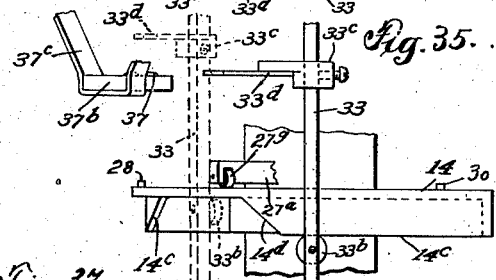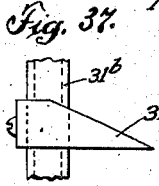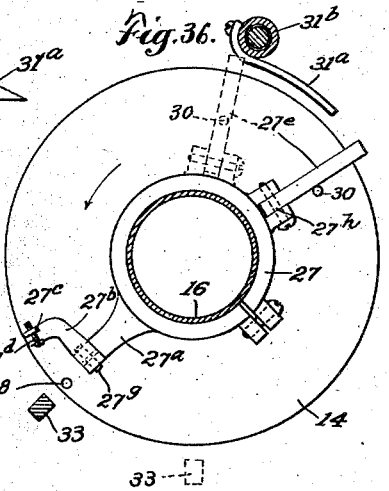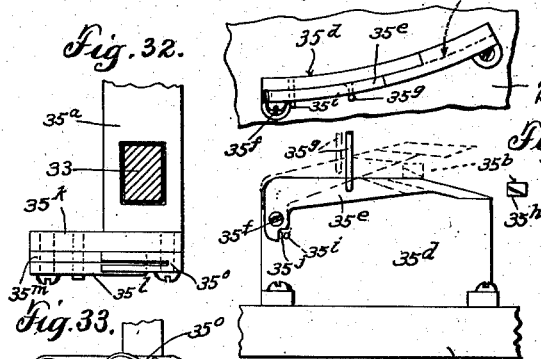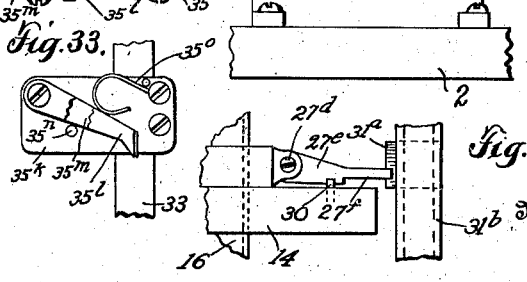

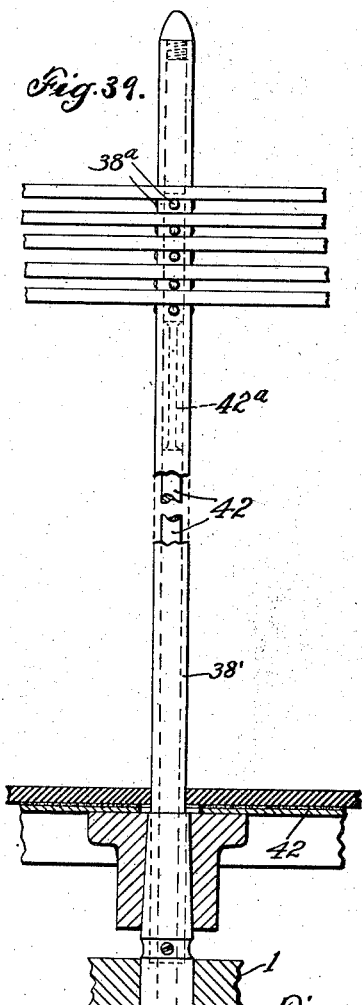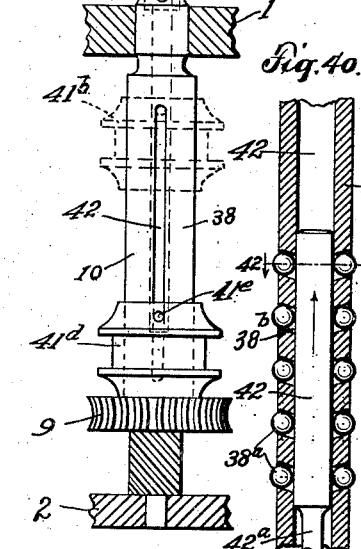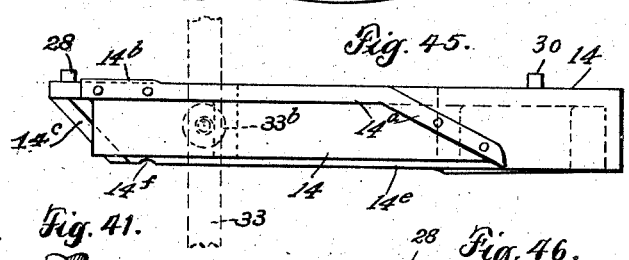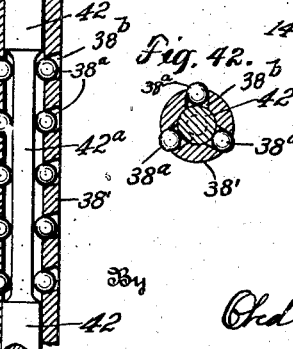

Patented July 2, 1929.

1,719,184

UNITED STATES PATENT OFFICE.

HENRY A. KOESTER AND CLIFFORD J. WATERS, OF MASSILLON, OHIO.

MULTIPLAYING GRAPHOPHONE.

Application filed December 22, 1924. Serial No. 757,373.

This invention relates to improvements in multi-playing graphophones wherein provision is made for automatically playing in succession a plurality of records without requiring manual operation or attention after the machine is started, the present embodiment of the invention relating more particularly to that class or type exemplified on the applications of Henry A Koester for Letters Patent for improvements in multi-playing graphophones filed February 3rd, and June 14th, 1921, Serial Nos. 442,034 and 477,404, respectively.

The primary object of the invention is to provide a generally improved machine of the type or class indicated, particularly designed and adapted for use in connection with graphophone parts of conventional form and arrangement, as well as one in which the parts and features of construction are so arranged and disposed relative to each other as to meet the varying demands of actual service.

A still further and important object is the provision of improved automatic disc record feeding and tone arm actuating mechanism which may be readily attached to or incorporated in graphophones of the ordinary conventional or cabinet type and which will not in any way interfere with the ordinary manual operation of the same through the usual and well known devices and attachments.

In carrying out the above objects, the turn table is provided with an upwardly extending central support or shaft adapted to extend through the usual central openings in the disc records, said central support or shaft being provided with a plurality of record engaging projections adapted to normally engage and support a plurality of disc records in superposed spaced relation to each other. Suitable means are provided for moving said record engaging projections and for successively feeding or dropping one record at a time to the turn table as the playing of the preceding record is finished, means being also provided for automatically raising the sound reproducer and tone arm from engagement with the record after the playing of each record, and moving the same beyond the periphery of the turn table to allow the next record to be fed or dropped into position upon the turn table, the tone arm being then automatically moved into position and lowered upon the record thus dropped for playing the same.

It will be seen that means are therefore provided for receiving and supporting a reserve supply of records and successively playing the same without further attendance from the operator, the construction and arrangement of the machine parts being such that the parts may be set so that any desired number of records will be played after which the machine will be automatically stopped, or the machine parts may be so set as to repeat any one record indefinitely, or as desired, or the machine may be manually stopped at any time, or if desired, one record may be played in the usual manner as on the ordinary phonograph.

The present improvements relate more specifically to the record holding and feeding mechanism, non-vibrating mechanism between the reproducer and the swinging and lifting mechanism being provided to prevent vibrations from the operating or driving mechanism being in any way transmitted to and reproduced through the horn or amplifier, together with suitable locking or latching mechanism to prevent accidental movement of the tone arm until the needle or stylus engages the record and an automatic stop to prevent the stylus from being drawn across the record when not traversing the record grooves. Improved means are also provided for manually tripping the stopping mechanism and for stopping the automatic mechanism after the playing of any record.

There are other features of the invention residing in elemental combinations and particular construction of parts, all as will hereinafter more fully appear.

With the above mentioned and other ends in view, the invention consists in the novel construction, arrangement and combination of parts, hereinafter described, illustrated in one of its embodiments in the accompanying drawings and particularly pointed out in the appended claims.

Referring to the drawings, forming a part of this specification, Figure 1 is a perspective view of a multi-disc record playing phonograph of the graphophone type, the supporting and mounting frame being removed from the cabinet, and the turn table and gear enclosing casing also removed for the purpose of clearer illustration of the parts.

Fig. 2 is a front elevation of the same, the reproducer and the corresponding or front portion of the tone arm being removed for the purpose of clearer illustration of the adjacent lever and connected parts on the top plate or bed.

Fig. 3 is a top plan view of the same, illustrating in particular the relative construction and arrangement of the regulating and stop levers.

Fig. 4 is an enlarged fragmentary cross sectional view of the mechanism for locking the mechanical stop lever in different positions.

Fig. 5 is an enlarged fragmentary top plan view, the dotted lines illustrating the relative arrangement of the spring motors and motor driven mechanism, the different positions of the tone arm and reproducer being diagrammatically illustrated in the relative starting and stopping positions of the reproducer in the playing of (10) ten and (12) twelve inch records.

Fig. 6 is an enlarged fragmentary top plan view of the worm and worm gear, the worm being thrown out by the resistance offered by the worm gear and the cam action offered by the teeth of the latter as hereinafter explained.

Fig. 7 is a detailed fragmentary top plan view of the mechanism for preventing retrograde movement of one of the gear actuated discs or rotors.

Fig. 8 is a fragmentary side elevation of the two-part or sectional tone arm and reproducer, the relative position of the latter with respect to the successive records on the turn table being illustrated in dotted lines.

Fig. 9 is a fragmentary top plan view partly in horizontal cross section of the tone arm carrying conduit or tube and the pawl and ratchet feeding mechanism therefor.

Fig. 10 is a detailed side elevation of the rotor discs or gears and the gear and clutch mechanism for driving such rotor gears or discs in opposite directions, the gearing being thrown in as in the automatic movement or actuation of the tone arm and reproducer in the automatic feeding of successive records.

Fig. 11 is a fragmentary top plan view of the same.

Fig. 12 is a cross sectional view of the main driving shaft and clutch mechanism and connected parts for driving the rotor discs and connected tone arm actuating parts in making an automatic change of records.

Fig. 13 is an enlarged central vertical sectional view, partly in side elevation, of the automatically operated locking or latching device for holding the tone arm operating mechanism against horizontal movement until the tone arm has been initially elevated preparatory to being returned over the played record beyond the outer periphery thereof preparatory to the turn table receiving and starting a new record.

Fig. 14 is a perspective view of the tone arm actuated clutch controlling lever member for throwing in the clutch between the main driving shaft and the rotor driving mechanism.

Fig. 15 is a fragmentary top plan view of the record disc releasing feeding and controlling mechanism extending between the rotors and the record disc supporting and tripping mechanism of the turn table.

Fig. 16 is a side elevation, partly in section, taken on line 16—16 of Fig. 15, the dotted lines indicating the actuation of the record dropping plunger mechanism of the turn table.

Fig. 16ᵃ is an enlarged horizontal sectional view of the record feeding and controlling mechanism operated through the rotor discs.

Fig. 17 is an enlarged fragmentary detailed view of a mechanically operated trip lever extending through the top or bed plate to cooperate with a control lever thereon.

Fig. 18 is a longitudinal sectional view, partly in section of the trip lever actuating mechanism and connected parts.

Fig. 19 is a fragmentary side elevation of the connected portions of the trip finger actuating shafts shown in Fig. 18.

Fig. 20 is an enlarged detailed view of the mechanical record selector actuating pawl and ratchet feed mechanism.

Fig. 21 is a similar view of the reverse side of same.

Fig. 22 is an enlarged top plan view of the worm and worm gear driving mechanism for mechanically feeding the tone tube below the tone arm and reproducer so that the latter has only its own weight to be carried and fed by the record groove, and acting as an automatic stop.

Fig. 23 is an enlarged fragmentary top plan view of the trip mechanism for ultimately releasing the worm from the worm gear and holding the worm out of engagement.

Fig. 24 is a side elevation of the mechanism shown in Fig. 22.

Fig. 25 is a side elevation of the upper or latch mechanism thereof taken at right angles to the position shown in Fig. 24.

Fig. 26 is a fragmentary side elevation illustrating the cam and roller mechanism for initially raising the trip bar to take tension off of the trip mechanism prior to the operation of the latter for disengagement.

Fig. 27 is a sectional view of the lower or hinged and geared end of the worm carrying yoke shown in Figs. 22 and 24.

Fig. 28 is a fragmentary top plan view of the rotor disc and rotor disc actuated mechanism for swinging the tone arm and reproducer to the respective playing and non-playing positions in connection with the record disc feeding and dropping mechanism.

Fig. 29 is a side elevation of the same.

Fig. 30 is a top plan view of the adjustable cam or track mechanism for releasing the tone arm swinging mechanism from one of the rotor discs as the reproducer and tone arm are swung to the beginning of the playing position and for adjusting the same to (10) ten or (12) twelve inch disc records.

Fig. 31 is a side elevation of the mechanism shown in Fig. 30, the adjustable cam or inclined track member being raised to dotted position to adapt the mechanism to (10) ten inch records.

Fig. 32 is a detailed top plan view of the tone arm actuating and shifting bar, together with the twin pawls for engaging with serrated latching mechanism for holding the tone arm in a relatively fixed position until positively swung to initial playing position preparatory to receiving another disc record.

Fig. 33 is a side elevation of the parts shown in Fig. 32.

Fig. 34 is a fragmentary top plan view of the upper and lower rotors together with the reproducer and tone arm supporting and actuating mechanism.

Fig. 35 is a side elevation of the same, the dotted lines showing the position of the tone arm actuating bar just before raising the tone arm and reproducer from the inner or concluding playing position of the reproducer.

Fig. 36 is a top plan view of the upper rotor and the arm and trip mechanism for throwing the tone arm carrying mechanism out of engagement with the rotor driving mechanism when the tone arm has been carried to its outermost position.

Fig. 37 is a detailed side elevation of the cam used to elevate the pivoted driving arm of the sound conduit tube out of engagement with the actuating pin of the rotor disc.

Fig. 38 is a fragmentary side elevation of the arm and cam mechanism shown in Fig. 36.

Fig. 39 is an enlarged side elevation of the central record disc holding and feeding shaft extending above the turn table, together with internal mechanism and radially movable elements for supporting a plurality of superposed record discs and successively releasing and dropping said record discs for automatic and continuous playing.

Fig. 40 is an enlarged longitudinal sectional view of the upper or record disc supporting and feeding portion of the central shaft, illustrating in particular the plunger mechanism for actuating the record disc supporting and releasing elements and for the release of the respective record discs carried thereby.

Fig. 41 is a similar view showing the radially movable record disc supporting elements in released position.

Fig. 42 is a cross sectional view of the record disc supporting and feeding mechanism taken on line 42—42 of Fig. 40.

Fig. 43 is a side elevation of the upper rotor disc, the latter being in an inverted position and showing the notch in one side to be engaged by a spring latch to prevent retrograde movement of the same.

Fig. 44 is a top plan view of the upper rotor disc and illustrating in particular the peripheral annular cam or cam track for initially engaging the roller and elevating the tone arm elevating and swinging bar.

Fig. 45 is a side elevation of the upper rotor disc and illustrating in particular the relation of the vertically movable tone arm actuating bar and roller to the adjacent parts.

Fig. 46 is a fragmentary side elevation of the upper rotor discs and illustrating in particular the recess and notch for receiving the roller of the movable tone arm actuating bar.

Similar numerals of reference designate like parts throughout all the figures of the drawings.

The frame adapted to carry and support the various working parts and which is adapted to be removably mounted within the machine cabinet may be of any suitable and convenient construction. In the present instance the improved frame comprises a top or bed plate 1, and the bottom or base plate 2, spaced a suitable distance apart and connected to each other by means of vertical tubular posts $31^b$.

In the present instance, spring motors $4^a$ and $4^b$ of the conventional type are mounted in bearings upon the vertical standards 4 and 5. Motion is imparted to a vertical shaft 6 by means of worm wheels 7, which latter engage with a worm $6^a$ of the shaft 6. A composite gear 8 is mounted on the shaft 6 and cooperates with the gear 11 mounted on a shaft $11^a$. The shaft $11^a$ has secured on its outer end a gear 12, consisting of a spur gear $12^a$, and a bevelled gear $12^b$. A spur gear 13 is mounted on the shaft $13^a$ and is provided with a clutch face $13^b$ (see Figs. 1, 11 and 12), the latter being designed to engage a second clutch member $13^c$, keyed to the shaft $13^a$, and to impart motion through the gear $13^d$ to a rotor disc 14 and a second rotor disc 15. These rotor discs 14 and 15 are loosely and rotatably mounted on the vertical sound conduit or tube 16. The pinion $13^d$ meshes with suitable gears on the inner or adjacent sides of the rotor discs 14 and 15 and consequently revolves the latter in opposite directions.

Upon reference to Fig. 5 of the drawings, it will be seen that the bevelled gear portion 12$^b$ of the gear 12 meshes with a gear 16' mounted upon a shaft 16$^a$, the latter being mounted in suitable bearings 16$^b$ and 16$^c$. The shaft 16$^a$ is provided at its outer end with a bevelled pinion 16$^d$, meshing with and driving a bevelled gear 17 on a shaft 17$^a$ and worm 17$^b$, as shown most clearly in Figs. 22 and 23 of the drawings. A worm gear 18 is mounted between bearings 18$^a$ and 18$^b$ on a shaft 18$^c$, the latter carrying a second worm 19, which latter engages with and affords motion to a worm gear 20, the latter being loosely mounted on the hollow vertical sound tube or conduit 16. A split collar 20$^a$ is provided to clamp tightly around the tube or conduit 16. (Figs. 8 and 9). Secured to the projecting lug 20$^b$ of the collar 20$^a$ are two pawls 20$^c$ and 20$^d$ held in engagement with an annular series of teeth or serrations 20$^e$ on the upper face side of the gear 20 by the bifurcated spring 20$^f$. It will thus be seen that when motion is imparted to the gear 20 by means of the worm 19, being driven by the worm 17$^b$, that the hollow tube or conduit will revolve in a clockwise direction. This motion will continue during the playing of the records but upon the needle or stylus reaching the deep groove 21 of the record disc, as indicated in Fig. 5 of the drawings, the resistance thus obtained will cause the teeth of the worm 19 to ride up and out of engagement with the teeth 20$^g$ (see Fig. 6) and at the same time cause the lever 22, pivoted at 22$^a$, having its opposite end 22$^b$ engaging the notch 23 (see Figs. 24 and 25) in the upper end of the vertical rod 23$^a$ to disengage from said notch 23 and allow the vertical rod 23$^a$ to drop.

The vertically movable rod 23$^a$ has secured to its side about midway of its length a cam plate 23$^b$, the latter having an inclined face 23$^c$, adapted to engage the pin 24 connected to the side of the yoke arm 24$^a$. As the yoke 24$^a$ is pivoted at its lower end in bearings 16$^c$ (see Figs. 22 and 24) the worm 18 and yoke part are carried clear of any engagement with the gear 20. The vertically movable bar 23$^a$ is adapted to be returned to its upper or original position by means of a roller 23$^d$ which is engaged by the inclined track or cam 14$^a$ of the upper rotor disc 14. It will be seen also that the vertically movable bar 23$^a$ is mounted in brackets 23$^e$ and 23$^f$, a coiled expansion spring 23$^g$ acting to force the bar 23$^a$ down when disengaged. As the teeth of the worm 18 are crowded out of mesh with the worm gear 20 (see Fig. 6) the upwardly extending arm 25 secured to and carried by the yoke 24$^a$ by its engagement with the lever 22 will throw the latter to the position shown in Fig. 23 in dotted line causing the disengagement of the vertically movable bar 23$^a$, leaving the latter free to be actuated by the coiled expansion spring 23$^g$. A spring 25$^a$, connected to the upper end of the arm 25, is adapted to move the worm 19 toward and to hold the same in engagement with the worm gear 20. The vertically movable post 23$^a$ is provided with an arm 23$^h$ (see Figs. 22, 24 and 12) adapted to come into engagement with and actuate an arm 26$^a$ of a pivoted lock or latch member 26 as the bar 23$^a$ drops, thereby permitting one of the lever members of the clutch actuating lever to swing to the dotted line position shown in Fig. 14 and the pin 28 on the upper rotor disc 14 to pass during the rotation of said rotor disc, as hereinafter referred to.

It will be observed that the end of the inclined track 14$^a$ has a slightly raised portion 14$^b$, as illustrated most clearly in Fig. 26 of the drawings, this being provided to take the strain or tension off of the notch 23, thereby permitting the end 22$^b$ of the lever 22 to swing easily out of engagement with the vertically movable bar 23$^a$, as the roller 23$^d$ rides over the said raised portion 14$^b$. In connection with the gear 20 and its related or associated parts, it should be understood that this gear is timed in synchronous relation to the grooves in the disc records to be played.

A second ring 27 is clamped upon and mounted about the vertical sound conduit section 16, said ring having an arm 27$^a$ (see Figs. 1, 11 and 36) provided with an extension 27$^b$ and an upturned lug portion 27$^c$ carrying a screw 27$^d$. The screw 27$^d$ is adapted to initially release the lock 26 by contacting with the vertically extending arm 26$^b$, the wire or arm 23$^h$ on the vertically movable bar 23$^a$ being designed to hold the lock or latch and the connected lever parts in an open position for a predetermined period. As the lock member 26 is tripped, the pin 28 on the upper rotor disc 14 (as the latter revolves) engages and moves the movable member or section 29, moving the latter to the dotted line position shown in Fig. 14 and permitting the pin 28 to pass beneath the relatively fixed or latch carrying member of the clutch actuating lever.

The ring 27 is also provided with a vertically movable arm 27$^e$ (Fig. 36) pivotally mounted at 27$^h$, and a pin 30 extending upwardly from the upper side of the upper rotor disc 14 is adapted to engage the pivoted arm 27$^e$ and carry the same together with the connected parts to the position shown in dotted lines in Fig. 36 of the drawings. The arm 27$^e$ is disengaged from the driving pin 30 of the rotor disc 14 by the outer or free end of the arm 27$^e$ passing over and upwardly on a cam plate 31$^a$ secured to a post 31$^b$. The under side of the vertically movable arm 27$^e$ is preferably notched as at 27$^f$ and as shown most clearly in Fig. 38 of the drawings, to allow the passage of the driving pin 28 thereunder after the driving pin 30 has caused the outer free end of the lever to be elevated on the incline 31$^a$, as above stated.

The arm 27$^a$ is provided on its under side with a roller 27$^g$ adapted to bear and ride upon the top surface of the rotor disc 14.

Upon reference to Fig. 1 of the drawings, it will be seen that the reproducer 32 is carried upon a two-part tone arm consisting of a vertically movable tone arm section 32$^a$, and a horizontally movable section 32$^b$. The vertically movable tone arm section 32$^a$ is pivoted to the tone arm section 32$^b$ at 32$^c$ and the tone arm section 32$^a$ communicates with the section 32$^b$ at this point. The tone arm section 32$^b$ is removable secured to the top plate 1 by the cap sleeve 32$^d$. Extending downwardly from the tone arm section 32$^b$ and carried thereby is a stop lever trip rod 32$^e$.

The pivoted vertically movable tone arm section 32$^a$ has a rearwardly extending portion 32$^f$ and a vertically extending bar 33 is slidably mounted in an arm 34 of a collar 34$^a$ clamped upon the sound conduit 16 leading downwardly to the throat of the amplifier. A similar collar 35 having an extending arm 35$^a$ is clamped upon and about the sound conduit section 16 below the rotor disc 14. The upper end of the vertically movable bar 33 is provided with a hooked portion 33$^a$ extending over the extension 32$^f$ of the pivotally mounted vertically movable tone arm section 32$^a$. The raising and lowering of the reproducer 32 at the outer or free end of the vertically movable pivoted tone arm section 32$^a$ is effected through the vertical motion of the bar 33 as the roller 33$^b$ engages with the cam portions 14$^c$ and 14$^d$ and the under face 14$^e$ of the rotor disc 14, a notch 14$^f$ (see Figs. 29, 45 and 46) being provided on the under side of the rotor disc to receive the roller 33$^b$ on the part 33, thereby correspondingly elevating the latter together with the parts 33$^a$ and 33$^b$ and correspondingly lowering or depressing the reproducer and stylus at the outer pivoted portion of the section 32$^a$.

An inward motion is imparted to the tone arm and reproducer and the connected or actuating parts by means of a pin 36 mounted on the upper side of the rotor disc 15, said pin 36 being adapted through the movement of the rotor disc 15 to engage a vertically movable arm 35$^b$ pivoted to the collar 35 at 35$^c$, as shown most clearly in Figs. 28, 29, and 31 of the drawings. A plate 35$^d$ is mounted upon the bottom plate 2 of the gear carrying frame, said plate being provided at its top with an inclined surface or track which at a predetermined time engages with and raises the free end of the arm 35$^b$ carrying the latter out of engagement with the subjacent driving pin 36 and thereby arresting or stopping the travel of the tone actuating bar or rod 33 and the connected parts.

In Figures 30 and 31 are shown the relatively fixed cam plate 35$^d$ and the supplemental or auxiliary cam or trackway 35$^e$ pivoted at 35$^f$. The relatively fixed and auxiliary cam members are used, as shown in full lines in Fig. 31 of the drawings, when a twelve inch disc record is to be played and when a ten inch disc record is to be played, the pivoted auxiliary track member 35$^e$ is raised to the dotted line position, as shown in Fig. 31, by means of a pull wire 35$^g$, thereby allowing the arm 35$^b$ to pass under the same and to engage the inclined track of the relatively fixed member at a later point in the revolution to start the reproducer at a corresponding point.

The pivoted vertically movable arm 35$^b$ has a bevelled off portion 35$^h$ on its under side to insure the outer free end of the arm gradually riding up over the cam or trackway. A pin 35$^i$ is mounted in the outer or face side of the block 35$^d$ and is adapted to be engaged by the depending nose portion 35$^j$ of the auxiliary track member 35$^e$ to limit the upward movement of the latter when actuated by the pull or actuating member 35$^g$.

Secured to the outer end of the arm 35$^a$ is a plate 35$^k$ and upon which plate a pair of pawls 35$^l$ and 35$^m$ are pivoted, said pawls being held downwardly to their normal position and in engagement with the stop pin 35$^n$ by means of the double springs 35$^o$, as shown most clearly in Figs. 1, 29, 32 and 33 of the drawings. The spring resisted pawls 35$^l$ and 35$^m$ are adapted to come into engagement with a series of serrations or teeth 36' formed in the top face of a plunger block 36$^a$, as shown most clearly in Figs. 1, 10, 11, 12 and 13 of the drawings. As there shown the plunger block 36$^a$ is mounted in a guide block or post 36$^b$ secured to the base plate 2.

A shoe 33$^f$ is provided at the lower end of the vertically movable bar 33 (see Figs. 1 and 29), said shoe or head 33$^f$ being adapted, when the bar 33 is depressed, to engage with and depress the roller 36$^c$ on the bearing pin connected to the block 36$^a$, thereby depressing the latter and releasing the pawls 35$^l$ and 35$^m$ from the teeth or serrations 36, a pin 36$^d$ (Fig. 13) moving in the slot 36$^e$ of the guide post 36$^b$, serving to limit the upward movement or travel of the plunger 36$^a$. The plunger 36$^a$ moves downwardly against the resistance of the spring 36$^f$, which latter serves to normally hold the plunger in elevated position, as shown, in Fig. 13 of the drawings.

Secured to the vertically movable bar 33 about midway of its length is a bracket 33c having attached thereto a flat horizontally extending spring 33d (see Figs. 1, 34 and 35 of the drawings), said spring being provided near its outer end with a hole 33e adapted to engage with one or the other of the balls 37 and 37a rotatably mounted in suitable ball receiving sockets in a plate 37b, the latter being mounted in a bracket 37c depending from the top plate 1. The hole 33e in the free end of the spring 33d will receive and be held by the ball 37 when a twelve inch record is being played and the adjustments therefor have been made, and same will be engaged by the ball 37a when a ten inch record is being played.

Rotary and reverse movements are imparted to the rotor discs 14 and 15 through the medium of the bevelled gear 13d meshing with the gears 14g and 15a when the clutch members 13b and 13c are in engagement during the interval between the conclusion of the playing of one record disc and the commencement of another and while the changing of record discs and the manipulation of the tone arm and reproducer are being made.

As a means of feeding or dropping a record from its elevated position on the central support or shaft 38' (and supported and released by the record engaging and releasing elements hereinafter referred to), a pin 15b (Fig. 15) is mounted on the inner end of the lever 15c pivotally secured at 15d to the under side of the rotor disc 15, said lever being rigidly held in one direction against the stop pin 15e by a spring 15f so that as the disc 15 rotates the pin 15b comes into contact with the lug 39 on the upper side of the horizontally movable bar 39a and thereby moves the latter longitudinally in the bearings 39b and 39c mounted on the bottom plate 2.

Pivotally attached at 39d to the bar 39a is an arm 39e, designed to actuate a rock shaft 39g by being pivotally connected at the end of a crank arm 39f at one end of the shaft 39g, the opposite end of the latter being provided with a second crank arm 39h and the crank shaft 39g being mounted in bearing brackets 39i and 39j. A torsion spring 39k surrounding the rock shaft 39g (see Figs. 1 and 15) serves to return the parts to their original or initial positions after each working impulse.

Pivotally connected to the ends of the crank arm 39h at 39l (see Fig. 15) is a vertical link 40, the latter being pivotally connected at 40a to the outer or free end of a pawl carrying arm 40b. The arm 40b is provided with pawls 40c and 40d, the pawl 40c being adapted to engage with the teeth 40e (see Figs. 16, 20 and 21) of the ratchet wheel 40f, the latter being provided with a cam 40g adapted to rotate on the shaft 40h.

As the cam 40g comes into engagement with the crank arm 41 the latter is gradually elevated and motion is imparted to the shaft 41a extending through the bearing sleeve 41b, the latter being supported in the members 4 and 5. A yoke arm 41c is connected to one end of the rock shaft 41a, the yoke portion of the yoke arm engaging with the sleeve 41b (see Figs. 15 and 39) mounted upon the turn table driving shaft 38. A pin 41e connects the sleeve 41d with an internal vertically movable plunger rod 42, the latter being adapted to reciprocate within the turn table driving shaft 38.

The record discs are normally held in a superposed spaced relation on the central record support or shaft 38', as shown most clearly in Fig. 39 of the drawings, and as the plunger rod 42 is moved upwardly the reduced or "necked in" portion 42a of the plunger will allow the record engaging and releasing elements 38a to recede and thus allow the record discs to drop down upon the table 42. In the present instance the radially movable record disc engaging elements are in the specific form of balls, the latter, in the present instance, being mounted in inwardly and downwardly inclined openings or ball race-ways 38b.

A device for returning the rod or plunger 42 to its normal or record holding and supporting position with respect to the elements 38a, or for tripping or disengaging the records manually when desired, consists of an arm 43 secured to the shaft 41a, (Fig. 2) said arm 43 being pivotally connected at its outer end to a sleeve member 43a, the latter being provided with a slot 43b, terminating at its upper end in an offset portion or recess 43c. A rod or handle 43d is slidably mounted within the sleeve member 43a and is provided with a pin 43e, the latter being adapted to move up and down in the slot 43b and allowing lost motion of the arm 43 when the device is mechanically operated.

When it is desired to operate the plunger 42 manually, the rod or stem 43d is pulled up by means of the knob or handle 43f and upon a slight movement from left to right the pin 43e is brought into engagement with the slot portion 43c.

The regulation stop mechanism consisting of the conventional control and stop levers 44, 44a, 44b, 44c, 44d and 44e may be mounted on the top plate 3, as shown most clearly in Fig. 3 of the drawings. The mechanical stop lever 45 is pivoted to the top plate 3 at 45a and on the under side of its handle portion is provided with a spherical recess 45b (see Fig. 4) adapted to receive and engage with a series of balls 45c located in similarly shaped recesses in the top of the top plate 3. The end 45d of the lever 45 is provided with a slot 45e (see Figs. 3 and 18) adapted to receive and actuate a pin 45f extending upwardly through a slot $3^a$ of the top plate 3. The pin $45^f$ is secured to a bar 46 slidably mounted in bearings $46^a$ and $46^b$ on the under side of the plate 3, as shown most clearly in Fig. 18 of the drawings. The bar 46 terminates at one end in an arm portion $46^c$ loosely engaging in a slot or recess $46^d$ of the trip finger $46^e$ connected to the oscillatory and longitudinally movable shaft $46^f$. The trip arm or finger $44^f$ is keyed to the shaft $46^f$ by means of a set screw $46^g$ engaging in a longitudinal slot $46^h$, as shown most clearly in Figs. 17 and 18 of the drawings. The shaft $46^f$ is mounted in bearings $46^i$ and $46^j$ depending from the top plate 1, and a slot $1^a$ formed in the latter permits of the requisite motion to the arm $44^f$ as actuated by the mechanism herein and hereinafter referred to.

The trip finger $46^e$ is actuated by pins 47 engaging the same in the course of their rotation by the rotatably mounted support therefor. These pins are of varying or graduated lengths, as shown most clearly in Figs. 1 and 15 of the drawings, and are secured in the face of the ratchet wheel $47^a$ attached to or made integral parts of the ratchet wheel $47^b$. The ratchet wheel $47^b$ is provided with teeth $47^c$ with which a pawl $40^d$ mounted on the reciprocatory arm $40^b$ engages, and shown most clearly in Figs. 16 and 21 of the drawings. Springs $40^i$ are designed to keep the pawls $40^c$ and $40^d$ in operative relation with the teeth of the discs $40^f$ and $47^b$. A flat spring $40^j$ secured to the under side of the top plate 1 serves to engage with the ratchet $40^f$ and prevent retrograde movement of the latter after given its various intermittent movements or working impulses. A similar spring $47^d$ operates in connection with the ratchet $47^b$, as shown most clearly in Fig. 20 of the drawings. It will be understood that upon the reciprocation of the arm $40^b$ through its connected parts alternate intermittent movement will be imparted to the ratchets $47^b$ and $40^f$. The ratchets $47^a$, $40^f$ and $40^g$ are loosely mounted on the shaft $40^h$ with reference to circumferential movement and in order to place a tension upon the ratchet disc $47^a$, a radially slotted concavo-convex shaped spring washer $47^e$ is connected to the end of the shaft $40^h$ by means of an adjusting screw $47^f$, as shown most clearly in Fig. $16^a$ of the drawings.

When it is desired to repeat any record, eliminating the automatic record feeding features and using the hand stop lever 44 and connected parts, the pull wire 48 (see Figs. 15 and 16) is lifted or actuated through the medium of suitable actuating mechanism on the top of the plate 2 (not shown), thereby swinging the crank lever $8^b$ and causing the end or arm $48^a$ to be moved inwardly to the dotted line position shown in Fig. 15 of the drawings, thereby causing such nose portion $48^a$ to intercept and engage with the outer end of the lever $15^c$ and consequently carrying the pin $15^b$ out of line with the lug 39 on the horizontal bar $39^a$ as the rotor disc 15 is rotated thus causing the depending pin $15^b$ to clear the lug 39 so that no motion is imparted to the reciprocatory bar $39^a$ and its connected parts for automatic operation.

The lever $48^b$ is pivoted at $48^c$ to a bearing plate or bracket $48^d$ mounted on the base plate 2.

As a means of preventing retrograde or reverse movement of the rotor disc 14 during the intervals of rest of the oppositely rotatable discs 14 and 15 (and while a record is being played) a bracket 49 is mounted upon one of the supporting posts $31^b$ (see Figs. 5 and 7), said bracket being provided with a horizontally movable pawl $49^a$ adapted to be held in engagement with the outer periphery of the rotor disc 14 and to drop into a notch or recess $14^h$ when the rotor disc 14 is at rest, as illustrated most clearly in Figs. 5 and 7 of the drawings. As shown, said pawl may be held to its work by means of a loop spring $49^b$.

Upon reference to Figs. 10, 11, 12 and 14 of the drawings, it will be seen that when the driving pin 28 of the rotor disc 14 comes into engagement with the arm 29 the shaft 49 and the clutch yoke $49^a$ secured thereto will be given motion sufficient to disengage the clutch parts $13^b$ and $13^c$, a coiled compression spring $49^b$ being interposed between the clutch member $13^c$ and collar $49^c$ secured on the shaft $13^a$. It will be seen also that a bearing $49^d$ at the top of a post or support forms a bearing for the end of the driving shaft $13^a$ which carries the bevel gear $13^d$. A supporting bracket $49^e$ is attached to the vertical support 5 and is provided with a bearing head carrying the upper end of the shaft 49, the lower end of the latter bearing in a socket bearing $49^f$ mounted on the base 2, as shown most clearly in Fig. 10 of the drawings.

Secured to the lower end of the vertical shaft 49 is a second arm or lever $49^g$ (see Figs. 10 and 12), the lever $49^g$ being adapted to come into engagement with a stop screw $49^h$ mounted in a bracket $49^i$ on a base plate 2. A horizontally extending lever 50 is pivoted to the bearing or plunger guide post $36^b$ at $50^c$, said lever 50 being provided at its free end with a hook $50^a$ adapted to engage the outer end of the lever $49^g$ when the opposite end of the lever 50 is raised by means of a wire $50^b$, the latter being adapted to be manually operated through suitable operating mechanism (not shown) on the top bed 1 of the machine and by which the clutch parts may be held out of engagement.

If it is desired to operate the machine manually in the ordinary manner,—cutting out or eliminating the automatic record feeding and tone arm operating mechanism and using the hand stop lever 44ᶜ for starting and stopping the motor, the clutch parts 13ᵇ and 13ᶜ may be permanently held apart by moving the hook end 50ᵃ of the lever 50 downwardly to engage the outer end of the lever 49ᵍ by operating the throw-out mechanism (not shown) on the top of the machine connected to the wire or pull rod 50ᵇ and as illustrated in Fig. 12 of the drawings. If desired to operate the machine automatically the hook 50ᵃ may be caused to release the lever 49ᵍ by reverse operation of the parts, thereby permitting the rotor discs 14 and 15 to be intermittently actuated through the intermittent clutch and clutch actuating mechanism, the latter operating in synchronous relation with the movements of the tone arm and reproducer with respect to the record just played, or about to be played, (as the case may be) and with the automatic record disc feeding mechanism operating through the central record supporting and feeding post 38'.

As shown in full lines in Figs. 3 and 15 of the drawings, the machine parts are shown set to stop after each record has been played, it being noted in Figs. 3 and 15, that the lever 45 has been moved to an extreme position, thereby bringing the trip arm 46ᵉ to the base of the longest pin or arm 47 and consequently the arm 46ᵉ is in line to be engaged by the base portions of all of the pins successively. Should it be desired, for example,—to play the entire series or set of six records, the arm 45 will be moved to its extreme opposite position, and carrying the trip arm 46ᵉ to substantially the full line position shown in Fig. 18, so as to be engaged by the outer end of the sixth or longest and last pin and be thus brought out of the pathway of the free end of the next succeeding or next shortest pin so that the latter and all succeeding trip pins 47 will clear the trip arm 46ᵉ.

From the foregoing description, taken in connection with the accompanying drawings, the operation and advantages of our invention will be readily understood. Thus our improvements permit the successive playing of a half dozen records without attention or care on the part of the user. First, the record to be played having been placed upon the turn table, the five selected records are disposed upon the spindle and the starting lever is actuated to permit the graphophone to operate in the usual manner; the motor setting the turn table and record in motion. Thereupon, the tone arm is moved into playing position and the needle is lowered upon the record, when the clutch mechanism immediately releases our improved attachments from the driving motor. The record then is played through in the normal manner, after which the multi-playing clutch is reconnected, the needle raised from the record and the tone arm is moved beyond the edge of the turn table. Then the next record is automatically lowered upon the first record and turn table, and the cycle of operations may be repeated.

Means further are provided for adjusting the mechanism to operate either with ten inch or twelve inch records, while an attachment may be operated to cause the motor to stop after any predetermined number of records have been played, or the same record may be played in repetition as often as desired. Finally, the controlling clutch may be thrown out, so as to disable the automatic mechanism and permit the ordinary mode of playing the records.

Having thus described some of the embodiments of our invention, without having attempted to set forth all the forms in which it may be made, or all the modes of its use, what we claim and desire to secure by Letters Patent is,—

1. In a graphophone, a turn table provided with a central shaft extending upwardly therefrom, extensible and retractible means associated with said shaft for supporting a plurality of disc records centrally over said shaft in superposed spaced parallel relation to each other, and automatic and manually operable means for actuating said extensible and retractible record supporting means.

2. In a graphophone, a turn table provided with a central shaft extending upwardly therefrom, radially movable means on said shaft for supporting a plurality of disc records centrally over said shaft in superposed spaced parallel relation to each other, and a plunger operable within said shaft having portions of different dimensions for actuating said radially movable record supporting means into and out of record engaging positions.

3. In a graphophone, a turn table, a turn table driving shaft and driving mechanism therefor, a record supporting shaft concentric with said driving shaft, means for individually supporting a plurality of disc records on said supporting shaft above said turn table, means for actuating said individual record supporting means, and means for manually actuating said individual record supporting means independently of said driving shaft driving mechanism.

4. In a multi-playing graphophone, a turn table and turn table actuating mechanism, a horizontally movable tone arm including a reproducer, rotor discs operatively connected to and actuating said tone arm and reproducer into and out of playing position, said rotor discs being mounted concentric with the axis of movement of said horizontally movable tone arm, means for causing the actuation of said tone arm actuating mechanism through the predetermined movements of said reproducer, and means for setting said tone arm actuating mechanism to conform to records of varying diameters.

5. In a graphophone, a motor driven turn table provided with an upwardly extending central support, a series of record engaging elements on said support, a series of records having central openings extending over said support and engaged by said record engaging elements, means within said support for moving said record engaging elements to and from record engaging positions, and means for automatically or manually operating said record engaging elements through said means within said support.

6. In a graphophone, a turn table, a turn table carrying and driving shaft, means for driving the latter, a central record supporting shaft concentric with said driving shaft and extending above said turn table, means on said central shaft for individually supporting a plurality of disc records above said turn table, means within said turn table supporting and driving shaft for actuating said individual record supporting means, and means for manually or automatically actuating said record supporting means through said shaft independently of said driving shaft actuating means.

7. In a multi-playing graphophone, the combination with a turn table and its actuating mechanism, and horizontally and vertically movable tone arm sections, including a reproducer on said vertically movable tone arm section; of means for actuating said tone arm sections and reproducer into and out of playing position and concentrically mounted with respect to the axis of movement of said horizontally movable tone arm section, means for actuating said tone arm and reproducer actuating mechanism through the movements of said reproducer at predetermined positions of the latter, and means for setting such tone arm and reproducer actuating mechanism to conform to records of varying diameters.

8. In a repeating graphophone, including a motor driven turn table, and a supply of records having central openings, a driving shaft therefor, and a central shaft extending from and rotatable with said turn table, means on said central shaft for individually supporting a plurality of records in spaced relation through the central openings of said records, means operable within said driving shaft during the rotation thereof for actuating said record supporting means to release and feed the lowermost record to said turn table, and means for manually and independently operating said means for actuating said record supporting means for releasing one or more of said records.

9. In a multi-playing graphophone, a motor driven turn table, a tone arm and reproducer mounted adjacent to the latter, a pair of rotor discs, means operated by the movement of the reproducer to the end of the playing position for starting the rotation of said discs in opposite directions, means operated by said rotor discs for lifting the reproducer and swinging the tone arm out of and into playing position at the conclusion and beginning of the playing of a record, means for stopping the actuation of said rotor discs during the movement of the reproducer in playing position, and means for automatically stopping the rotation of said turn table after any predetermined number of records has been played.

10. In a multi-playing graphophone, a motor driven turn table, reproducing mechanism in movable cooperative relation thereto, means for mechanically feeding said reproducer mechanism along and in the direction of its feeding movements in playing position upon a record on said turn table, means controlled by the movements of said reproducer for throwing said feeding mechanism into and out of operation upon the initial record playing and concluding movements of said reproducer mechanism, means actuated by said reproducer for moving the reproducer to and from its record playing and non-playing positions relative to said turn table, and means for varying said reproducer actuating mechanism for the playing of records of varying dimensions.

11. In a multi-playing graphophone, including a cabinet, a motor driven turn table, reproducing mechanism in cooperative relation to the latter, record supporting and feeding mechanism arranged concentrically above and rotatable with said turn table, means controlled by the movements of said reproducing mechanism for actuating said record supporting mechanism for feeding a record to be played upon the record previously played and upon the movement of said reproducing mechanism out of the pathway of the new record to be played, means for automatically stopping the rotation of the turn table after any predetermined numbed of records have been played, means for setting such mechanism for playing records of different diameters, and means for repeating any record played.

12. In a graphophone, a turn table, record supporting means above and rotatable with the latter, a series of records carried by said record supporting means, means for actuating said record supporting means whereby to engage or disengage a record, a horizontally movable tone arm section extending above said turn table, a vertically movable tone arm section carrying a reproducer, means for moving said horizontally and vertically movable tone arm sections toward and from their record playing positions, means for throwing said tone arm actuating mechanism out of operation and holding same in such position during the playing of a record, and means actuated by said tone arm actuating mechanism for operating said record supporting and feeding mechanism when said tone arm and reproducer are held outwardly beyond the periphery of the turn table preparatory to the playing of a new record.

13. In a graphophone, a motor driven turn table provided with an upwardly extending central support, a series of record engaging elements on said support, a series of records having central openings extending over said support and engaged by said record engaging elements, means within said support and operable beneath said turn table for moving said record engaging elements to and from their record engaging positions, a horizontally movable tone arm section above said turn table, a vertically movable tone arm section carrying a reproducer, means for simultaneously moving said horizontally and vertically movable tone arm sections, and means for actuating said record engaging elements of said support and releasing a record when said tone arm and reproducer are swung outwardly beyond the periphery of the turn table as the playing of each record is completed.

14. In a graphophone, a motor driven shaft carrying a turn table and an upwardly extending record supporting shaft having record engaging radially movable elements, disc records extending centrally over said shaft and individually supported by said elements, horizontally and vertically movable pivoted tone arm sections above said turn table, said vertically movable tone arm section carrying a reproducer, means for raising said vertically movable tone arm section and reproducer and swinging the latter outwardly beyond the periphery of said turn table as the playing of each record is completed, and means for adjusting the mechanism for playing records of different sizes.

15. In a machine of the class described, a motor driven turn table, a tone arm horizontally movable over said turn table and provided with a reproducer, a sound conduit section leading from said tone arm, rotor discs mounted on said conduit section, gear mechanism for feeding said conduit section in the direction of movement of the tone arm and reproducer during the playing of a record, means for disengaging said conduit section feeding gear mechanism, means for rotating said rotor discs in opposite directions, means for operating said rotor disc actuating mechanism for lifting the tone arm and reproducer and swinging the same beyond the periphery of the turn table, and means for moving the reproducer back to the beginning of the playing position upon a record to be played and automatically stopping the rotation of said rotor discs and throwing said conduit section feeding mechanism into operation.

16. In a multi-playing phonograph, including a cabinet, a turn table, a vertically disposed circumferentially movable sound conduit section in said cabinet, a tone arm mounted above and movable relatively of said conduit section and provided with a reproducer to swing above said turn table, means for feeding said conduit section with and in the direction of movement of the reproducer in playing position upon a record, rotor discs on said conduit section, means operated by the movements of said reproducer at the beginning and end of its playing position for throwing said conduit section feeding mechanism into and out of operation, respectively, means for actuating said rotor discs between the playing of records for lifting the reproducer and swinging the same to and from its playing positions with respect to a record, and means operated by said rotor discs for stopping the rotation of the latter and said tone arm and reproducer actuating mechanism connected therewith during the playing of a record.

17. In a multi-playing graphophone, including a cabinet, a motor driven turn table, a sound conduit section in said cabinet, a tone arm swivelled above said conduit section and provided with a reproducer to swing above said turn table, means on said sound conduit section for feeding the latter during the movements of the reproducer in playing position upon a record, rotor discs on said sound conduit section, means operated by the movements of the reproducer beyond the end of the playing position for disengaging said conduit section feeding mechanism, means operated by said rotor discs for lifting the reproducer and swinging the same with said tone arm beyond the periphery of said turn table, means operated by said rotor discs for moving the reproducer back to the beginning of the playing position and then finally lowering the reproducer upon the record, and means operated by said rotor discs for stopping the rotation of the latter and holding the same in a stationary position during the playing of a record.

18. In a machine of the character described, a motor driven turn table, a horizontally movable tone arm extending over said turn table and provided with a reproducer, a sound conduit section leading from said tone arm and movable relatively thereof, rotor discs mounted on said conduit section, gear mechanism for feeding said conduit section with and in the direction of the feeding movement of the reproducer during the playing of a record, means operable by the movement of the reproducer for disengaging said conduit section feeding mechanism, means operated by the movement of the reproducer for starting the rotation of said rotor discs and means operated by said rotor discs for lifting the reproducer swinging the latter beyond the periphery of the turn table, moving the reproducer back to the beginning of the playing position, and finally lowering the reproducer upon the record to be played and automatically stopping the rotation of said rotor discs.

19. In a machine of the character described, a motor driven turn table, a tone arm and reproducer mounted to swing above said turn table, a vertical sound conduit section leading from said tone arm and movable relatively thereof, rotor discs loosely and rotatably mounted on said conduit section, means operable by the movements of the reproducer to the end of the playing position for starting the rotation of said rotor discs, means operated by said rotor discs for lifting the reproducer, swinging the latter beyond the periphery of the turn table, moving the reproducer back to the beginning of the playing position, and finally lowering the reproducer upon the record and automatically stopping the rotation of said rotor discs, means for feeding said vertical sound conduit section during the playing of a record, and means operated by the movement of the reproducer at the conclusion of its playing position for throwing said conduit section feeding mechanism out of operation during the changing of a record and the non-playing movements of said tone arm and reproducer.

20. In a graphophone including a cabinet, a motor driven shaft carrying a turn table and an upwardly extending record support having radially movable record engaging elements, means within said support for actuating said record engaging elements, horizontally and vertically movable tone arm sections extending above said turn table, said vertically movable tone arm section being provided with a reproducer, means for automatically raising said vertically movable tone arm section and said reproducer and swinging said horizontally movable tone arm outwardly beyond the periphery of said turn table when the playing of a record is completed, means for automatically releasing the lowermost of said record engaging elements to drop the lowermost engaged record upon the turn table as said tone arm sections and reproducer are swung outwardly to clear the record, means for moving said tone arm sections and reproducer back to playing position and lowering said vertically movable tone arm section and reproducer into engagement with a record so fed, means for adjusting the tone arm and reproducer actuating mechanism for playing records of different sizes, and means for throwing said record feeding mechanism out of operation for repeating a record.

21. In a machine of the character described, a motor driven turn table provided with an upwardly extending central support, a series of record engaging elements on said support, a series of records having central openings extending over said central support and engaged by said record engaging elements, means within said central support and operable from beneath said turn table for moving said record engaging elements to and from record engaging positions, a horizontally movable tone arm extending over said turn table and provided with a reproducer, a sound conduit section leading from said tone arm and movable relatively thereof, rotor discs mounted on and rotatable independently of said conduit section, means for feeding said conduit section to correspond approximately with the feeding motion of the reproducer during the playing of a record, means operable by the movements of the reproducer beyond the final playing position for disengaging said conduit section feeding mechanism, means operated by the movements of the reproducer at the end of the playing position for starting the rotation of said rotor discs, and means operated by said rotor discs for lifting the reproducer swinging the latter beyond the periphery of the turn table, lowering a new record from said record carrying means to said turn table, moving the reproducer back to the beginning of the playing position, and finally lowering the reproducer upon the record and automatically stopping the rotation of said rotor discs.

In testimony whereof we have affixed our signatures.

HENRY A. KOESTER.
CLIFFORD J. WATERS.